United States Patent Office 3,822,259
Patented July 2, 1974

3,822,259
7-PHENYL-1H[1,3]-OXAZINO[3,2-a][1,4]BENZO-
DIAZEPINE-1,3(2H)-DIONES
Robert B. Moffett, Kalamazoo, Mich., assignor to The
Upjohn Company, Kalamazoo, Mich.
No Drawing. Filed Nov. 2, 1971, Ser. No. 194,913
Int. Cl. C07d 87/16
U.S. Cl. 260—244 R  3 Claims

ABSTRACT OF THE DISCLOSURE

A 7-phenylbenzodiazepine of formula II:

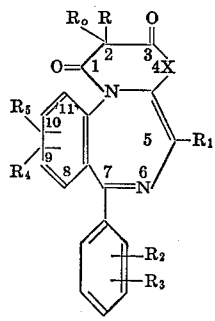

wherein X is selected from the group consisting of oxygen, sulfur, and >N—$R_6$ in which $R_6$ is hydrogen, alkyl of 1 to 3 carbon atoms, inclusive, acetyl, and propionyl, wherein R and $R_0$ are selected from the group consisting of hydrogen and alkyl of 1 to 3 carbon atoms, inclusive; wherein $R_1$ is selected from the group consisting of hydrogen, alkyl as defined above, acetoxy and propionoxy; and wherein $R_2$, $R_3$, $R_4$, and $R_5$ are selected from the group consisting of hydrogen, halogen, nitro, cyano, trifluoromethyl, amino, and alkyl, alkoxy, alkylthio, alkylsulfinyl, alkylsulfonyl, alkanoylamino in which the carbon moiety is of 1 to 3 carbon atoms, inclusive, and dialkylamino in which alkyl is defined as above, is prepared from the corresponding 2-substituted benzodiazepine of formulae I or Ia

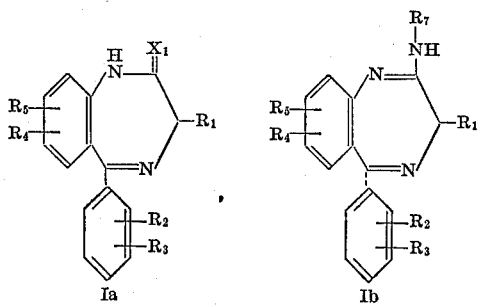

wherein $X_1$ is oxygen or sulfur, $R_1$, $R_2$, $R_3$, $R_4$, and $R_5$ are defined as above, $R_7$ is hydrogen, or alkyl defined as above, by reaction with a malonyl dichloride III

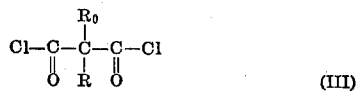

wherein $R_0$ and R are hydrogen, or alkyl as defined above.

The new products of formula II including their pharmacologically acceptable acid addition salts are useful as seatives, hypnotics, anticonvulsants, tranquilizers, and muscle relaxants in mammals and birds. Also as feed additives for increasing growth rate and feed efficiency of livestock and poultry.

BACKGROUND OF THE INVENTION

Field of the invention

This invention is directed to new organic compounds and is particularly concerned with novel oxazino, pyrimido, and thiazino [1,2-a][1,4]benzodiazepin-1,3(2H, 4H)-diones and a process for the production thereof.

The novel compounds and the process of production therefor can be illustratively represented as follows:

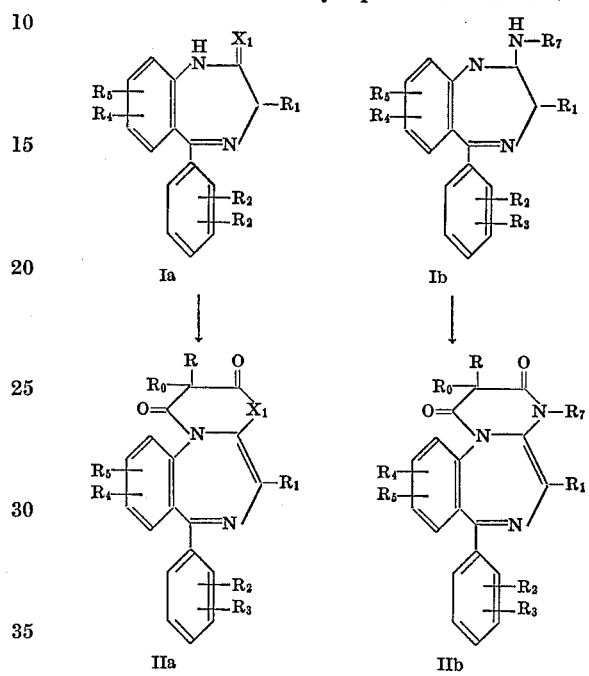

wherein $X_1$ is selected from the group consisting of oxygen and sulfur; wherein R, $R_0$ and $R_7$ are selected from the group consisting of hydrogen and alkyl of 1 to 3 carbon atoms, inclusive; wherein $R_1$ is selected from the group consisting of hydrogen, alkyl as defined above, acetoxy and propionoxy; wherein $R_2$, $R_3$, $R_4$, and $R_5$ are selected from the group consisting of hydrogen, halogen, nitro, cyano, trifluoromethyl, amino, and alkyl, alkoxy, alkylthio, alkylsulfinyl, alkylsulfonyl, alkanoylamino in which the carbon moiety of 1 to 3 carbon atoms, and dialkylamino in which alkyl is defined as above.

The products of formula IIb can further be acylated if $R_7$ is hydrogen. Thus, the products of this invention can be presented by formula II

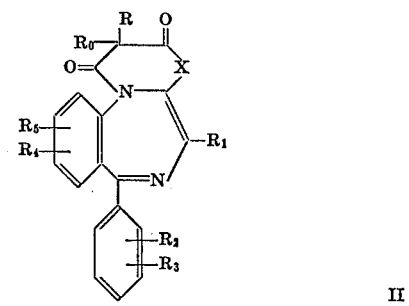

II wherein $R_0$, R, $R_1$, $R_2$, $R_3$, $R_4$, and $R_5$ are defined as above, and X is selected from the group consisting of oxygen, =N—$R_6$ in which $R_6$ is hydrogen alkyl of 1 to 3 carbon atoms, inclusive, acetyl and propionyl.

The invention further includes the pharmacologically acceptable acid addition salts of the compounds of formula II.

The process of this invention comprises: treating a benzodiazepine of formula Ia or Ib with a malonyl dichloride of the formula III

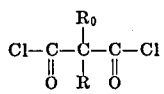

wherein $R_0$ and R are hydrogen or alkyl of 1 to 3 carbon atoms, inclusive to obtain the compounds of formula IIa and IIb. Further acylation with acetic or propionic anhydride or acetyl or propionyl chloride of compounds of formula IIb ($R_7$ is H) gives the compounds of formula II wherein X is =N—COCH$_3$ and =N—COCH$_2$CH$_3$.

DESCRIPTION OF THE PREFERRED EMBODIMENT

Lower alkyl groups of 1 to 3 carbon atoms, inclusive are exemplified by methyl, ethyl, propyl, and isopropyl.

The carbon chain moiety of alkoxy, alkylthio, alkylsulfinyl, alkylsulfonyl, dialkylamino which is of 1 to 3 carbon atoms, inclusive, can be defined as lower-alkyl of 1 to 3 carbon atoms, inclusive, as above.

The alkanoylamino group of 1 to 3 carbon atoms, consists of formamido

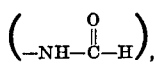

acetamido and propionamido.

The term halogen includes fluorine, chlorine, and bromine.

The novel compounds of the formula II and pharmacologically acceptable addition salts thereof have sedative, hypnotic, anticonvulsant, tranquilizing, and muscle relaxant effects in mammals and birds. Also as feed additives they increase growth rate and feed efficiency of livestock and poultry.

The pharmacologically acceptable acid addition salts of compounds of formula II contemplated in their invention, are the hydrochlorides, hydrobromides, hydroiodides, sulfates, phosphates, cyclohexanesulfamates, methanesulfonates and the like, prepared by reacting a compound of formula II with the selected pharmacologically acceptable acid.

Sedative effects of 9-chloro-2,2-dimethyl-7-phenyl-1H[1,3]oxazino[3,2 - a][1,4]benzodiazepine - 1,3(2H)-dione are shown by the following tests in mice:

Chimney test: [Med. Exp. 4, 145 (1961)]: The effective intraperitoneal dosage for 50% of mice (ED$_{50}$) is 15 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. ED$_{50}$ equals the dose of test compound at which 50% of the mice remain in the dish. The ED$_{50}$ (intraperitoneal administration) in this test was 26 mg./kg.

Pedestal test: The untreated mouse leaves the pedestal in less than a minute to climb back to the floor of the standard mouse box. Tranquilized mice will stay on the pedestal for more than 1 minute. The ED$_{50}$ (intraperitoneal administration) is 23 mg./kg.

Nicotine antagonism test: Mice in a group of 6 are injected with the test compound (9-chloro-2,2-dimethyl-7-phenyl - 1H - 1,3 - oxazino-[3,2-a][1,4]benzodiazepine-1,3(2H)-dione). Thirty minutes later the mice including control (untreated) mice are injected with nicotine salicylate (2 mg./kg.). The control mice show overstimulation, i.e., (1) running convulsions followed by (2) tonic extensors fits; followed by (3) death. An intraperitoneal dosage of 16 mg./kg. of the test compound protected 50% of the mice against (2) and (3) (ED$_{50}$).

The following compounds have (by intraperitoneal injection) ED$_{50}$ as shown in the table below:

| Compound | ED$_{50}$ (in mg./kg.) | | | |
|---|---|---|---|---|
| | Ch | D | P | Ni |
| 9-chloro-2,2,4-trimethyl-7-phenylpyrimido[1,2-a][1,4]benzodiazephine-1,3-(2H,4H)-dione | 45 | 6.3 | 6.3 | 112 |
| 9-chloro-2,2-dimethyl-7-(o-chlorophenyl)-1H-[1,3]-oxazino[3,2-a][1,4]benzodiazepine-1,3(2H)-dione | 28 | 1.0 | 3.6 | 5.6 |

NOTE.—Ch=chimney test; D=dish test; p=pedestal test; Ni=nicotine antagonism (3) test.

The pharmaceutical forms contemplated by this invention include pharmaceutical compositions suited for oral, parenteral, and rectal use, e.g., tablets, powder packets, cachets, dragées, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring, and flavoring agents may be added.

For mammals and birds food premixes, with starch, oatmeal, dried fishmeat, fishmeal, flour, and the like can be prepared.

To obtain increased animal weight or food efficiency, increase of milk or egg production, between 100–1000 g. per ton of feed are used of compounds of formula II or pharmacologically acceptable acid addition salts thereof.

As tranquilizer the compounds of formula II and its pharmacologically acid addition salts can be used in dosages of 1–100 mg./kg. in oral or injectable preparations as described above, to alleviate tension and anxiety in mammals, or birds, such as e.g., occurs when animals are in travel.

Other acid addition salts of the compounds of formula II can be made such as the fluosilicic acid addition salts which are useful mothproofing compounds or the trichloro acetates useful as herbicides against Johnson grass, Bermuda grass, yellow foxtail, and green foxtail, and quack grass.

The starting materials of formula IA of this invention, substituted or unsubstituted 1,3-dihydro-5-phenyl-2H-1,4-benzodiazepine-2-ones and 2-thiones, are described by Sternbach et al. J. Med. Chem. 6, 261 (1963), and G. A. Archer and L. H. Sternbach [J. Org. Chem. 20, 231 (1964) and U.S. Pat. 3,422,091].

Starting materials of formula Ib are described in J. Org. Chem. 29, 231 (1964).

In carrying out the process of this invention, a compound selected from formula Ia or Ib in an organic solvent is treated with a malonyl dichloride in the presence of a tert. organic amine base. As solvents compounds such as tetrahydrofuran, dioxane, diethylether, dibutylether, diglyme, benzene, dimethylformamide, and the like can be used. In the preferred embodiment an organic base e.g. triethylamine, tripropylamine, diisopropyl ethylamine, pyridine, N-methylpiperidine and other N-alkyl-piperidines or pyrrolidines are used. The molar ratio of the benzodiazepine Ia or IIa to the reagent, malonyl dichloride, is preferably between 1:3, an excess of reagent being preferred. The temperature of the reaction is usually between —70 to 100° C. and the reaction time between 1–10 hours. After most of the reaction has taken place, room temperature (1–7 days) or heating up to reflux for 1–6 hours is used to complete the reaction. The products, IIa or IIb, thus obtained, are isolated and purified by conventional procedures, e.g. evaporation of the reaction mixture, extraction, chromatography, crystallization and the like.

The following preparation and examples are illustrative of the processes and products of the present invention, but are not be construed as limiting.

PREPARATION.—DIMETHYLMALONYL DICHLORIDE

A mixture of 100 g. (0.757 mole) of dimethylmalonic acid and 200 ml. of thionyl chloride was stirred under reflux for 6 hours. After standing overnight the excess was removed *in vacuo* and the liquid was distilled through a 7″ (⅛″ helices packed) column. The product was distilled smoothly at 47° C. (12 mm.) yielding 103.5 g. (81%) of dimethylmalonyldichloride as a colorless liquid.

*Example 1.*—9 - Chloro - 2,2-dimethyl-7-phenyl-1H-[1,3]oxazino[3,2-a][1,4]benzodiazepine-1,3(2H)-dione A solution of 5.4 g. (0.02 mole) of 7-chloro-1,3-dihydro-5-phenyl - 2H - 1,4 - benzodiazepin-2-one, 20.8 ml. (0.13 mole) of triethylamine, and 8.45 g. (0.05 mole) of dimethylmalonyl dichloride in 100 ml. of tetrahydrofuran was stirred at room temperature for 18 hours. The mixture was evaporated to dryness *in vacuo* below 50° C. and the residue was mixed with water and ether. A solid separated, insoluble in both layers, and was collected and washed with water and ether giving 5.5 g. of (75%) of yellow solid of melting point 170–172.5° C. This was dissolved in ether, filtered, diluted with cyclohexane and boiled on a steam bath to about 100 ml. when crystallization started. After cooling, the product was collected washed with pentane and dried giving 4.4 g. of yellow crystals of 9-chloro-2,2 - dimethyl - 7 - phenyl - 1H-[1,3]oxazino[3,2-a][1,4]benzodiazepine-1,3(2H)dione of melting point 174° C.

*Anal.* Calcd. for $C_{20}H_{15}ClN_2O_3$: C, 65.49; H, 4.12; Cl, 9.66; N, 7.64. Found: C, 65.42; H, 3.98; Cl, 9.86; N, 7.46.

*Example 2.*—9 - Chloro - 7 - (o-chlorophenyl)-2,2-dimethyl - 1H[1,3]oxazino[3,2 - a][1,4]benzodiazepine-1,3(2H)-dione To a solution of 3.05 g. (0.01 mole) of 7-chloro-5-(o-chlorophenyl) - 1,3 - dihydro - 2H - 1,4 - benzodiazepine-2-one and 10 ml. (0.07 mole) of triethylamine in 100 ml. of tetrahydrofuran under nitrogen was added with stirring, at room temperature, 3.4 g. (0.02 mole) of dimethylmalonyl dichloride. After stirring at room temperature for 7 hours and standing 3 days, the solvent was removed *in vacuo* at 40° and the residue was well shaken with ice water and ether. The resulting solid was collected, washed with water and ether and dried yielding 3.32 g. of light yellow solid of melting point 185–188° C. This was dissolved in 75 ml. of ethyl acetate, filtered hot, and concentrated to 15 ml. On cooling 2.44 g. of yellow crystals of 9 - chloro - 7 - (o-chlorophenyl)-2,2-dimethyl-1H[1,3]oxazino[3,2-a][1,4]benzodiazepine - 1,3(2H) - dione of melting point 188–190° C. were obtained. The ether solution was separated, washed with water, sodium bicarbonate solution, saturated salt solution and dried over anhydrous sodium sulfate. After filtration and evaporation, the residue was combined with ethyl acetate filtrate, concentrated, and cooled giving 0.67 g. more product. The total yield was 77.5%.

*Anal.* Calcd. for $C_{20}H_{14}Cl_2N_2O_3$: C, 59.87; H, 3.52; Cl, 17.67; N, 6.98. Found: C, 60.07; H, 3.55; Cl, 17.96; N, 7.31.

*Example 3.*—9 - Chloro - 2,2-dimethyl-7-phenylpyrimido-[1,2-a][1,4]benzodiazepine-1,3(2H,4H)-dione A solution of 2.7 g. (0.01 mole) of 2-amino-7-chloro-5-phenyl-3H-1,4-benzodiazepine and 3.5 ml. (0.025 mole) of triethylamine in 100 ml. of tetrahydrofuran, under nitrogen, was cooled to near 0° C. by an ice bath and 1.86 g. (0.11 mole) of dimethylmalonyl dichloride in 10 ml. of tetrahydrofuran was added dropwise with stirring under nitrogen during 10 minutes. The mixture was allowed to come to room temperature and was stirred overnight. Evaporation *in vacuo* gave a yellow solid which was shaken with methylene chloride and ice water. The solid insoluble in both layers was collected, washed with methylene chloride, water, ether, and dried giving 3.18 g. of yellow solid of melting point 253–263° [after sintering or melting (with bubbling) at 194–200° C. and resolidifying]. This was recrystallized from 100 ml. of 1-butanol (filtered hot) yielding 1.59 g. (43.6%) of 9 - chloro - 2,2-dimethyl-7 - phenylpyrimido[1,2-a][1,4]benzodiazepine of melting point 261.5–265° C. (dec.) as a yellow solid;

*Anal.* Calcd. for $C_{20}H_{16}ClN_3O_2$: C, 65.67; H, 4.41; Cl, 9.69; N, 11.49. Found: C, 65.71; H, 4.73; Cl, 9.55; N, 11.21.

In a similar experiment (2.7 g. of 2 - amino - 7 - chloro-5 - phenyl - 3H - 1,4 - benzodiazepine; 5.2 ml. of triethylamine; 3.03 g. of dimethylmalonyl dichloride in 10 ml. of tetrahydrofuran at reflux) gave 4,4' - dimethylmalonyl) bis[9-chloro - 2,2 - dimethyl - 7 - phenylpyrimido[1,2-a][1,4]benzodiazepine - 1,3(2H,4H) - dione isopropyl alcohol solvate:

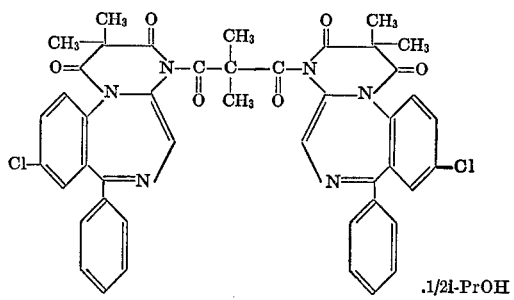

It had a melting point 198–230° C. with decomposition.

*Anal.* Calcd. for $C_{45}H_{36}Cl_2N_6O_6 \cdot \frac{1}{2}C_3H_8O$: C, 65.11; H, 4.70; Cl, 8.27; N, 9.80. Found: C, 64.97; H, 4.71; Cl, 8.38; N, 10.17.

*Example 4.*—9 - Chloro-2,2,4-trimethyl-7-phenylpyrimido [1,2-a][1,4]benzodiazepine-1,3(2H,4H)-dione A solution of 2.85 g. (0.01 mole) of 7-chloro-2-methylamino - 5 - phenyl-3H-1,4-benzodiazepine and 4.2 ml. (0.03 mole) of triethylamine in 100 ml. of tetrahydrofuran under nitrogen was cooled to near 0° (by an ice bath) and 2.53 g. (0.015 mole) of dimethylmalonyl dichloride in 10 ml. of tetrahydrofuran was slowly added with stirring. The mixture was stirred at 0° C. for 1 hour, at room temperature for 2.5 hours, and then allowed to stand for 3 days. It was thereafter refluxed for 3.5 hours, concentrated *in vacuo* and diluted with ice water and ether. The solid product insoluble in both layers was collected and washed with water and ether. Recrystallization from 1.25 ml. of 2-propanol yielded 2.02 g. of yellow, crystalline 9 - chloro - 2,2,4 - trimethyl - 7 - phenylpyrimido[1,2-a][1,4]benzodiazepine - 1,3(2H,4H) - dione of melting point 225.5–226.5° C. An additional 0.98 g. was obtained from the ether solution (the total yield 3.0 g., 79%).

*Anal.* Calcd. for $C_{21}H_{18}ClN_3O_2$: C, 66.40; H, 4.78; Cl, 9.33; N, 11.06. Found: C, 66.50; H, 4.80; Cl, 9.36; N, 11.05.

*Example 5.*—9 - Chloro - 2,2 - dimethyl-7-phenyl-1H[1,3]thiazino[3,2-a][1,4]benzodiazepine-1,3(2H)-dione To a solution of 5.74 g. (0.02 mole) of 7-chloro-1,3-dihydro-5-phenyl-2H-1,4-benzodiazepin-2-thione and 20.8 ml. (0.15 mole) of triethylamine in 100 ml. of tetrahydrofuran under nitrogen was added with stirring 8.45 g. (0.05 mole) of dimethylmalonyl dichloride. After stirring at room temperature for 4.25 hours the mixture was evaporated to dryness *in vacuo* and the residue was well shaken with ice water and ether. The solid, insoluble in both layers, was collected, washed with water and ether and then dried giving 4.06 g. of yellow solid. This was dissolved in 725 ml. of methanol, filtered hot, concentrated to 300 ml. and cooled yielding 2.12 g. (28%) of yellow crystals of 9-chloro - 2,2 - dimethyl-7-phenyl-1H[1,3]thiazino[3,2-a][1,4]benzodiazepine-1,3-(2H)-dione of melting point in part at 204–205° and finally at 210–211°.

*Anal.* calcd. for $C_{20}H_{15}ClN_2O_2S$: C, 62.74; H, 3.92; Cl, 9.26; N, 7.32; S, 8.37. Found: C, 62.59; H, 4.00; Cl, 9.29; N, 7.19; S, 8.14.

*Example 6.*—9 - Chloro - 2,2 - dipropyl - 7 - (2,6-difluorophenyl) - 1H - [1,3]oxazino[3,2 - a][1,4]benzodiazepine-1,3(2H)-dione In the manner given in Example 1, 7-chloro-1,3-dihydro-5-(2,6 - difluorophenyl) - 2H - 1,4 - benzodiazepine-2-one can be reacted with dipropylmalonyl dichloride in the presence of tripropylamine to give 9-chloro-2,2-dipropyl-7 - (2,6 - difluorophenyl) - 1H - 1,3 - oxazino[3,2-a][1,4] benzodiazepine-1,3(2H)-dione.

*Example 7.*—9 - Nitro - 2,2 - diethyl-7-(o-chlorophenyl)-1H - [1,3]oxazino[3,2-a][1,4]benzodiazepine-1,3(2H)-dione In the manner given in Example 1, 7-nitro-1,3-dihydro-5-(o-chlorophenyl)-2H-1,4-benzodiazepine-2-one can be reacted with diethylmalonyl dichloride in the presence of diisopropylethylamine to give 9-nitro-2,2-diethyl-7-(o-chlorophenyl) - 1H - [1,3]oxazino[3,2 - a][1,4]benzodiazepine-1,3(2H)-dione.

*Example 8.*—2,2,5 - Trimethyl-7-(p-fluorophenyl)phenyl-1H - [1,3]oxazino[3,2-a][1,4]benzodiazepine-1,3(2H)-dione In the manner given in Example 1, 3-methyl-1,3-dihydro-5-(p - fluorophenyl)-2H-1,4-benzodiazepine-2-one can be reacted with dimethylmalonyldichloride in the presence of N-methylpiperidine to give 5-methyl-2,2,5-trimethyl-7-(p - fluorophenyl) - 1H - [1,3]oxazino[3,2-a][1,4]benzodiazepine-1,3(2H)-dione.

*Example 9.*—11 - Ethylsulfiinyl - 2,2 - diethyl-7-(p-diethylaminophenyl) - 1H - [1,3]oxazino[3,2-a][1,4]benzodiazepine-1,3(2H)-dione In the manner given in Example 1, 9-ethylsulfinyl-1,3-dihydro - 5 - (p - diethylaminophenyl)-2H-1,4-benzodiazepine-2-one can be reacted with diethyl malonyl dichloride in the presence of triethylamine to give 11-ethylsulfinyl-2,2-diethyl - 7 - (p - diethylaminophenyl) - 1H - [1,3]oxazino[3,2-a][1,4]benzodiazepine-1,3(2H)-dione.

*Example 10.*—9 - Methylsulfonyl - 7 - (o - fluorophenyl) - 1H - [1,3]oxazino[3,2-a][1,4]benzodiazepine-1,3(2H)-dione In the manner given in Example 1, 7-methylsulfonyl-1,3-dihydro - 5 - (o-fluorophenyl)-2H-1,4-benzodiazepine-2-one can be reacted with malonyl dichloride in the presence of pyridine at —70° in Dry Ice-acetone to give 9-methylsulfonyl - 7 - (o - fluorophenyl)-1H-[1,3]oxazino[3,2-a][1,4]benzodiazepine-1,3(2H)-dione.

*Example 11.*—9,10 - Dicyano-2,2-diethyl-7-(p-nitrophenyl) - 1H - [1,3]thiazino[3,2-a][1,4]benzodiazepine-1,3(2H)-dione In the manner given in Example 5, 7,8-dicyano-1,3-dihydro - 5 - (p - nitrophenyl) - 2H - 1,4-benzodiazepine-2-thione can be reacted with diethylmalonyl chloride in the presence of N-methylpyrrolidine to give 9,10-dicyano-2,2-diethyl - 7 - (p-nitrophenyl-1H-[1,3]thiazino[3,2-a][1,4] benzodiazepine-1,3(2H)-dione.

*Example 12.*—9-Trifluoromethyl - 2,2' - dimethyl - 7 - (p-acetylaminophenyl) - 1H - [1,3]thiazino[3,2 - a][1,4] benzodiazepine-1,3-(2H)-dione In the manner given in Example 5, 7-trifluoromethyl-1,3 - dihydro - 5 - (p-acetylaminophenyl)-2H-1,4-benzodiazepine-2-thione can be reacted with dimethylmalonyl dichloride in the presence of dipropylethylamine to give 9 - trifluoromethyl - 2,2 - dimethyl-7-(p-acetylaminophenyl) - 1H - [1,3]thiazino[3,2 - a][1,4]benzodiazepine-1,3 (2H)-dione.

*Example 13.*—9 - Bromo-10-isopropyl-2,2'-dipropyl-7-(m-dipropylaminophenyl) - 1H - [1,3]thiazino[3,2-a][1,4] benzodiazepin-1,3(2H)-dione In the manner given in Example 5, 7-bromo-8-isopropyl - 1,3 - dihydro - 5 - (m-dipropylaminophenyl)-2H-1,4-benzodiazepine-2-thione can be reacted with dipropylmalonyl dichloride in the presence of N-ethylpiperidine to give 9-bromo-10-isopropyl-2,2-dipropyl-7-(m-dipropylaminophenyl) - 1H - [1,3]thiazino[3,2 - a][1,4]benzodiazepine-1,3(2H)-dione.

*Example 14.*—11-Propionylamino - 7 - phenyl - 1H - [1,3] thiazino[3,2-a][1,4]benzodiazepine-1,3(2H)-dione In the manner given in Example 5, 9-propionylamino-1,3-dihydro-5-phenyl-2H-1,4-benzodiazepine-2-thione can be reacted with malonyl dichloride in the presence of diisopropylethylamine to give 11-propionylamino-7-phenyl - 1H - [1,3]thiazino[3,2 - a][1,4]benzodiazepine - 1,3 (2H)-dione.

*Example 15.*—9 Bromo - 2,2' - dipropyl - 7 - (m-bromophenyl) - 1H - [1,3]thiazino[3,2 - a][1,4]benzodiazepine-1,3(2H)-dione In the manner given in Example 5, 7-bromo-1,3-dihydro - 5 - (m-bromophenyl) - 2H - 1,4 - benzodiazepine-2-thione can be reacted with dipropylmalonyl dichloride in the presence of triethylamine to give 9-bromo-2,2-dipropyl-7-(m-bromophenyl) - 1H - [1,3]thiazino[3,2-a][1,4] benzodiazepine-1,3(2H)-dione.

*Example 16.*—5 - Acetoxy - 10 - fluoro-2-propyl-2-ethyl-7-(p-ethylphenyl) - 1H - [1,3]thiazino[3,2-a][1,4]benzodiazepine-1,3(2H)-dione In the manner given in Example 5, 3-acetoxy-8-fluoro-1,3 - dihydro - 5 - (p-ethylphenyl)-2H-1,4-benzodiazepine-2-thione can be reacted with 2-propyl-2-ethylmalonyl dichloride in the presence of N-ethylpyrrolidine to give 5-acetoxy - 10 - fluoro - 2 - propyl-2-ethyl-7-(p-ethylphenyl) - 1H - [1,3]thiazino[3,2 - a][1,4]benzodiazepine - 1,3 (2H)-dione.

*Example 17.*—9 - Amino - 2,2 - diethyl-7-(o-chlorophenyl) - 1H - [1,3]oxazino[3,2-a][1,4]benzodiazepine-1,3-(2H)-dione The 9 - nitro - 2,2 - diethyl - 7 - (o-chlorophenyl)-1H-[1,3]oxazino[3,2 - ][1,4]benzodiazepine - 1,3(2H) - dione (Example 7) can be reduced with zinc and acetic acid to yield 9-amino-2,2-diethyl-7-(o-chlorophenyl)-1H-[1,3] oxazino[3,2-a][1,4]benzodiazepine-1,3(2H)-dione.

*Example 18.*—9-Chloro-4-ethyl-2,2-dimethyl-7-(o-chlorophenyl)pyrimido[1,2 - a][1,4]benzodiazepine - 1,3(2H, 4H)-dione.

In the manner given in Example 4, 7-chloro-2-ethylamino-5-(o-chlorophenyl)-3H-1,4-benzodiazepine can be reacted with dimethylmalonyl dichloride in the presence of triethylamine to give 9-chloro-4-ethyl-2,2-dimethyl-7-(o - chlorophenyl)pyrimido[1,2 - a][1,4]benzodiazepine-1,3-(2H,4H)-dione.

*Example 19.*—9-chloro-4-methyl-7-(o-chlorophenyl)-pyrimido[1,2-a][1,4]benzodiazepine-1,3(2H,4H)-dione In the manner given in Example 4, 7-chloro-2-methylamino-5-(o-chlorophenyl)-3H-1,4-benzodiazepine can be reacted with malonyl dichloride in the presence of diisopropylethylamine to give 9-chloro-4-methyl-7-(o-chlorophenyl)pyrimido[1,2 - a][1,4]benzodiazepine - 1,3(2H, 4H)-dione.

*Example 20.*—9-Nitro-2,2-dipropyl - 7 - (o-chlorophenyl) pyrimido[1,2 - a][1,4]benzodiazepine - 1,3(2H,4H)-dione In the manner given in Example 3, 7-nitro-2-amino-5-(o-chlorophenyl)-3H-1,4-benzodiazepine can be reacted with dipropylmalonyl dichloride in the presence of pyridine to give 9-nitro-2,2-dipropyl-7-(o-chlorophenyl)pyrimido[1,2-a][1,4]benzodiazepine-1,4(2H,4H)-dione.

*Example 21.*—9-Chloro - 2,2 - dibutyl - 7 - (2,6-difluorophenyl)pyrimido[1,2-a][1,4]benzodiazepine - 1,3(2H,4H)-dione In the manner given in Example 3, 7-chloro-2-amino-5-(2,6-difluorophenyl) - 3H-1,4 - benzodiazepine can be reacted with butylmalonyl dichloride in the presence of N-methylpiperidine to give 9-chloro - 2,2 - dibutyl-7-(2,6-difluorophenyl)pyrimido[1,2 - a][1,4]benzodiazepine - 1,3-(2H,4H)-dione.

*Example 22.*—2,2,4-Trimethyl - 10 - methylthio-7-(p-fluorophenyl)pyrimido[1,2 - a][1,4]benzodiazepine - 1,3-(2H,4H)-dione In the manner given in Example 4, 8-methylthio-2-methylamino-5-(p-fluorophenyl) - 3H - 1,4 - benzodiazepine can be reacted with dimethylmalonyl dichloride in the presence of triethylamine to give 2,2,4-trimethyl-10-methylthio - 7 - (p - fluorophenyl)pyrimido[1,2 - a][1,4]benzodiazepine-1,3-(2H,4H)-dione.

*Example 23.*—11-Ethylsulfinyl - 2,2 - diethyl - 7 - (p-diethylaminophenyl)pyrimido[1,2 - a][1,4]benzodiazepine-1,3(2H,4H)-dione In the manner given in Example 3, 9-ethylsulfinyl-2-amino-5-(p-diethylaminophenyl) - 3H - 1,4 - benzodiazepine can be reacted with diethylmalonyl dichloride in the presence of N-methylpyrrolidine to give 11-ethylsulfinyl-2,2-diethyl - 7 - (p-diethylaminophenyl)pyrimido[1,2-a][1,4]benzodiazepine-1,3(2H,4H)-dione.

*Example 24.*—8-Propylsulfonyl - 2 - methyl -2 - propyl-4-ethyl - 7 - (m-propylphenyl)pyrimido[1,2-a][1,4]benzodiazepine-1,3(2H,4H)-dione In the manner given in Example 4, 6-propylsulfonyl-2-ethylamino - 5 - (m-propylphenyl)-3H-1,4-benzodiazepine can be reacted with methyl propyl malonyl dichloride in the presence of triethylamine to give 8-propylsulfonyl-2-methyl - 2 - propyl - 4 - ethyl - 7 - (m-propylphenyl)pyrimido[1,2-a][1,4]benzodiazepine-1,3(2H,4H)-dione.

*Example 25.*—9-(Trifluoromethyl)-2,4-dipropyl - 7 - (4-nitro - 2 - isopropylphenyl)pyrimido[1,2-a][1,4]benzodiazepine-1,3(2H,4H)-dione In the manner given in Example 4, 7-(trifluoromethyl)-2 - propylamino - 5 - benzodiazepine can be reacted with propyl malonyl dichloride in the presence of N-propylpiperidine to give 9-(trifluoromethyl)-2,4-dipropyl-7-(4-nitro 2 - isopropylphenyl)pyrimido[1,2 - a][1,4]benzodiazepine-1,3(2H,4H)-dione.

*Example 26.*—9-Trifluoromethyl - 2,4 - dipropyl - 7 - (4-amino - 2 - isopropylphenyl)pyrimido[1,2-a][1,4]benzodiazepine-1,3(2H,4H)-dione The 9-(Trifluoromethyl) - 2,4 - dipropyl - 7 - (4-nitro-2-isopropylphenyl)pyrimido[1,2 - a][1,4]benzodiazepine-1,3(2H,4H)-dione (Example 25) can be reduced with zinc and acetic acid to yield 9-trifluoromethyl)-2,4-dipropyl-7-(4-amino - 2 - isopropylphenyl)pyrimido[1,2-a][1,4]benzodiazepine-1,3(2H,4H)-dione.

In the manner illustrated by the preceding examples other 7-phenylbenzodiazepines of formula II can be obtained. Representative compounds, thus produced, include:

9-bromo-8-methyl-2,2-diethyl-7-(o-cyanophenyl)-1H-[1,3-oxazino][3,2-a][1,4]benzodiazepine-1,3(2H)-dione;

10-isopropylsulfinyl-2,2-dimethyl-7-(p-aminophenyl)-1H-[1,3-oxazino][3,2-a][1,4]benzodiazepine-1,3(2H)-dione;

9,11-diethoxy-2,2-dipropyl-7-(2,4-dimethylphenyl)-1H-[1,3-oxazino][3,2-a][1,4]benzodiazepine-1,3(2H)-dione;

9-diethylamino-10-nitro-7-phenyl-1H-[1,3-oxazino][3,2-a]1,4]benzodiazepine-1,3(2H)-dione;

10-chloro-11-propyl-7-(2-methyl-4-chlorophenyl)-1H-[1,3-oxazino][3,2-a][1,4]benzodiazepine-1,3(2H)-dione;

8-cyano-2-methyl-2-ethyl-7-(m-nitrophenyl)-1H-[1,3-oxazino][3,2-a][1,4]benzodiazepine-1,3(2H)-dione;

9-acetylamido-10-nitro-2,2-dimethyl-7-phenyl-1H-[1,3-oxazino][3,2-a][1,4]benzodiazepine-1,3(2H)-dione;

5-carbethoxy-9-propylsulfinyl-2,2-diethyl-7-phenyl-1H-[1,3-oxazino][3,2-a][1,4]benzodiazepine-1,3(2H)-dione;

9-isopropylthio-5-carbopropoxy-7-(p-formamidophenyl)-1H[1,3-ozaxino][3,2-a][1,4]benzodiazepine-1,3(2H)-dione;

9-bromo-8-propyl-2,2-diethyl-7-(o-chlorophenyl)-1H-[1,3]thiazino-[3,2-a][1,4]benzodiazepine-1,3(2H)-dione;

8-isopropyl-10-nitro-2,2-diethyl-7-(o-isopropylsulfinylphenyl)-1H[1,3]triazino[3,2-a][1,4]benzodiazepine-1,3(2H)-dione;

10-cyano-9-acetamido-7-(m-fluorophenyl)-1H[1,3]triazino[3,2-a][1,4]benzodiazepine-1,3(2H)-dione;

10-chloro-8-isopropyl-2-methyl-2-ethyl-7-phenyl-1H[1,3]triazino[3,2a][1,4]benzodiazepine-1,3(2H)-dione;

5,10,11-triethyl-2,2-dimethyl-7-(p-nitrophenyl)-1H[1,3]triazino[3,2a][1,4]benzodiazepine-1,3(2H)-dione;

8,10-dimethoxy-2,2-diethyl-7-(p-othoxyphenyl)-1H[1,3]triazino[3,2a][1,4]benzodiazepine-1,3(2H)-dione;

9-fluoro-2,2-dipropyl-7-(p-dipropylaminophenyl)1H-[1,3]triazino[3,2a][1,4]benzodiazepine-1,3(2H)-dione;

10-propoxyamido-2,2-dimethyl-7-(m-chlorophenyl)-1H-[1,3]triazino[3,2-a][1,4]benzodiazepine-1,3(2H)-dione;

9-nitro-2,2,4-tripropyl-7-(o-cyanophenyl)pyrimido[1,2-a][1,4]benzodiazepine-1,3(2H,4H)-dione;

9-cyano-11-trifluoromethyl-2,2-diethyl-7-(2-fluoro-4-ethylphenyl)pyrimido[1,2-a][1,4]benzodiazepine-1,3-(2H,4H)-dione;

8-bromo-11-dipropylamino-2,2-dimethyl-7-phenylpyrimido[1,2-a][1,4]benzodiazepine-1,3(2H,4H)-dione;

8,10-diethoxy-2,2,4,5-tetramethyl-7-(m-nitrophenyl)pyrimido[1,2-a][1,4]benzodiazepine-1,3(2H,4H)-dione;

11-dimethylamino-2,2,4-triethyl-7-(p-aminophenyl)pyrimido[1,2-a][1,4]benzodiazepine-1,3-(2H,4H)-dione;

9-amino-10-chloro-2,2-dimethyl-4-isopropyl-7-(m-bromophenyl)pyrimido[1,2-a][1,4]benzodiazepine-1,3-(2H,4H)-dione;

10-fluoro-11-bromo-2,2-dipropyl-4-methyl-7-(diisopropylphenyl)pyrimido[1,2-a][1,4]benzodiazepine-1,3-(2H,4H)-dione;

8,9-dicyano-2-isopropyl-9-methyl-7-(2,4-diethylphenyl)-pyrimido[1,2-a][1,4]benzodiazepine-1,3(2H,4H)-dione;

10-propylsulfonyl-2-methyl-2,4-diethyl-7-(m-ethylsulfinyl)pyrimido[1,2-a][1,4]benzodiazepine-1,3-(2H,4H)-dione;

10-ethylthio-2,2,4-tripropyl-7-(p-isopropylthiophenyl)pyrimido[1,2-a][1,4]benzodiazepine-1,3(2H,4H)-dione;

and the like.

Treatment of those pyrimido compounds in which X is NH with acetyl or propionyl chloride or bromide as acetic or propionic anhydrides provides the corresponding amides of formula II in which X is

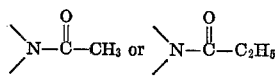

Treating the compounds of formula II with pharmacologically acceptable acid such as hydrochloric, hydrobromic, phosphoric, sulfuric, acetic, propionic, toluenesulfonic, methanesulfonic, tartaric, citric, lactic, malic, maleic, cyclohexanesulfamic acids produces the pharmacologically acceptable salts of these compounds of formula II which can be used like the free base compounds of formula II. Salt formation is achieved in conventional manner by reacting the compounds of formula II with excess of a selected acid in a suitable medium e.g. water, a lower alkanol, ether, or acetone and recovering the salt by evaporating the solvent, preferably in vacuo.

I claim:
1. 9-Chloro - 2,2 - dimethyl - 7 - phenyl-1H[1,3]oxazino[3,2-a][1,4]benzodiazepine-1,3(2H)-dione.
2. 9-Chloro - 2,2 - dimethyl - 7 - (o-chlorophenyl)1H-[1,3]oxazino[3,2-a][1,4]benzodiazepine-1,3-(2H)-dione.
3. A compound selected from the group consisting of 7-phenylbenzodiazepines of formula II

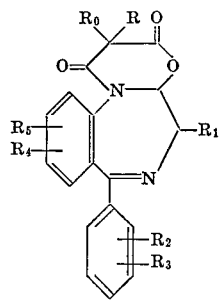

II wherein R and $R_0$ are selected from the group consisting of hydrogen and alkyl of 1 to 3 carbon atoms, inclusive; wherein $R_1$ is selected from the group consisting of hydrogen, alkyl as defined above, acetoxy, and propionoxy; and wherein $R_2$, $R_3$, $R_4$, and $R_5$ is selected from the group consisting of hydrogen, halogen, nitro, cyano, trifluoromethyl, amino, and alkyl, alkoxy, alkylthio, alkylsulfonyl, alkylsulfinyl, alkanoylamino in which the carbon moiety is of 1 to 3 carbon atoms, and diakylamino in which alkyl is defined as above, and the pharmacologically acceptable acid addition salts thereof.

References Cited
UNITED STATES PATENTS
3,696,095 10/1972 Hellerbach _____ 260—244
3,373,159 3/1968 Martin et al. _____ 260—244

HARRY I. MOATZ, Primary Examiner

U.S. Cl. X.R.

260—239 BD, 243 R; 26—256.4 F; 424—244, 246, 248, 251

UNITED STATES PATENT OFFICE
CERTIFICATE OF CORRECTION

PATENT NO. : 3,822,259
DATED : July 2, 1974
INVENTOR(S) : Robert B. Moffett

Page 1 of 3

It is certified that error appears in the above-identified patent and that said Letters Patent are hereby corrected as shown below:

Column 1, line 13-25, Formula II should appear as shown below instead of as in the patent:

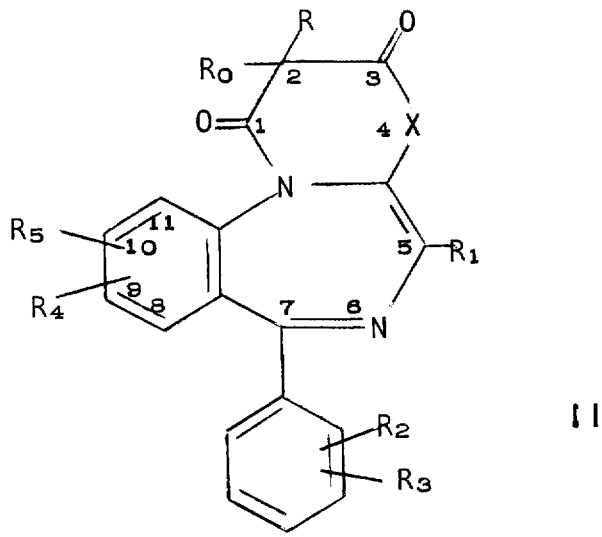

II

Column 1, line 67, "seatives" should read -- sedatives --.
Column 2, line 6, "benzodiazepin" should read -- benzodiazepine --; line 10-20, Formula Ib should appear as shown below instead of as in the patent:

UNITED STATES PATENT OFFICE
CERTIFICATE OF CORRECTION

PATENT NO. : 3,822,259
DATED : July 2, 1974
INVENTOR(S) : Robert B. Moffett

It is certified that error appears in the above-identified patent and that said Letters Patent are hereby corrected as shown below:

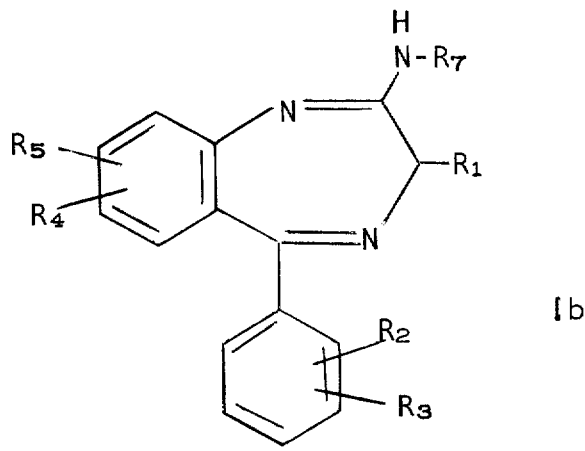

Column 3, line 40, "their" should read -- this --. Column 4, line 7, "benzodiazephine" should read -- benzodiazepine --. Column 6, line 14, "4,4'-dimethylmalonyl)" should read -- 4,4'-(dimethylmalonyl) --. Column 7, line 34, "Ethylsulfiinyl" should read -- Ethylsulfinyl --; line 61, "chloride" should read -- dichloride --. Column 8, line 3, "benzodiazepin" should read -- benzodiazepine --. Column 8, line 46, "[3,2- ]" should read -- [3,2-a] --; line 17, "(p-fluorophenyl-" should read -- (p-fluorophenyl)- --. Column 10, line 2, "1,4]" should read -- [1,4] --; line 14, "-ozaxino]" should read -- -oxazino] --; line 25, "[3,2a]" should read -- [3,2-a] --; line 27, "[3,2a]"

UNITED STATES PATENT OFFICE
CERTIFICATE OF CORRECTION

PATENT NO. : 3,822,259
DATED : July 2, 1974
INVENTOR(S) : Robert B. Moffett

It is certified that error appears in the above-identified patent and that said Letters Patent are hereby corrected as shown below:

should read -- [3,2-a] --; line 29, "[3,2a]" should read -- [3,2-a] --; line 31, "[3,2a]" should read -- [3,2-a] --.

Signed and Sealed this

Fifth Day of October 1976

[SEAL]

Attest:

RUTH C. MASON
Attesting Officer

C. MARSHALL DANN
Commissioner of Patents and Trademarks